(12) United States Patent
Lukis et al.

(10) Patent No.: US 7,836,573 B2
(45) Date of Patent: Nov. 23, 2010

(54) METHOD OF MACHINING A PART

(75) Inventors: Lawrence J. Lukis, Wayzata, MN (US);
Gregory M. Bloom, Lake Elmo, MN (US)

(73) Assignee: Proto Labs, Inc., Maple Plain, MN (US)

( * ) Notice: Subject to any disclaimer, the term of this patent is extended or adjusted under 35 U.S.C. 154(b) by 1064 days.

(21) Appl. No.: 11/586,223

(22) Filed: Oct. 25, 2006

(65) Prior Publication Data

US 2008/0120823 A1 May 29, 2008

(51) Int. Cl.
*B23P 13/04* (2006.01)
*B22C 9/00* (2006.01)

(52) U.S. Cl. .......................... 29/557; 29/527.1; 29/530; 29/558; 164/17

(58) Field of Classification Search .................... 29/557, 29/458, 527.1, 527.2, 357, 558, 564, 424, 29/423; 408/112; 164/17; 264/221; 703/2
See application file for complete search history.

(56) References Cited

U.S. PATENT DOCUMENTS

| | | | |
|---|---|---|---|
| 3,264,128 A | 8/1966 | Argueso, Jr. et al. |
| 3,834,687 A | 9/1974 | Martin et al. |
| 3,921,343 A | 11/1975 | Speyer |
| 4,132,685 A | 1/1979 | Speyer |
| 4,132,689 A | 1/1979 | Speyer |
| 4,195,048 A | 3/1980 | Jung |
| 4,445,956 A | 5/1984 | Freeman et al. |
| 4,729,804 A | 3/1988 | Dillner |
| 4,822,013 A | 4/1989 | Johnson |
| 5,138,918 A | 8/1992 | Attardi et al. |
| 6,012,965 A | 1/2000 | Savoie |
| 6,073,451 A | 6/2000 | Tarumizu |
| 6,156,250 A | 12/2000 | Torres et al. |

(Continued)

FOREIGN PATENT DOCUMENTS

WO   WO 01/15850 A2   3/2001

OTHER PUBLICATIONS

Sarma, Sanjay E., Reference Free Part Encapsulation: A New Universal Fixturing Concept, Journal of Manufacturing Systems, 1997.

(Continued)

*Primary Examiner*—Derris H Banks
*Assistant Examiner*—Tai Nguyen
(74) *Attorney, Agent, or Firm*—Shewchuk IP Services, LLC; Jeffrey D. Shewchuk (57) ABSTRACT

A method and apparatus are provided for total profile machining of a part, such as from a block of thermoplastic polymer. A first side of the part is machined together with an encircling recess. A registration/potting fixture is placed into the encircling recess. The registration/potting fixture is used to evacuate air from the machined side of the part and to pressure pack degassed fluid potting compound against the machined side of the part. The registration/potting fixture is cooled such as with a coolant to solidify the potting material. Then the registration/potting fixture is used to fixture the block in a new orientation for CNC machining another side of the part. Upon removal of the potting material from the part, the total profile machined part is freed for shipment to the customer.

19 Claims, 12 Drawing Sheets

U.S. PATENT DOCUMENTS

| | | | | |
|---|---|---|---|---|
| 6,286,581 | B1 * | 9/2001 | Gustafson | 164/17 |
| 6,386,264 | B2 * | 5/2002 | Gustafson | 164/17 |
| 6,588,086 | B2 * | 7/2003 | Trybus | 29/557 |
| 6,688,871 | B1 * | 2/2004 | Lee et al. | 425/129.1 |
| 6,907,657 | B2 | 6/2005 | Wilbert et al. | |
| 2006/0099887 | A1 | 5/2006 | Kitamura et al. | |

OTHER PUBLICATIONS

Frank, Matthew C., Rapid Planning for CNC Milling—A New Approach For Rapid Prototyping, Journal of Manufacturing Systems, 2004.

Smith, Charles S. III, CyberCut: A World Wide Web Based Design-To-Fabrication Tool, Journal of Manufacturing Systems, 1996.

Ahn, Sung H., Reference Free Part Encapsulation (RFPE): An Investigation of Material Properties And The Role of RFPE In A Taxonomy Of Fixturing Systems, J. Mfg. Sys., 2002.

Sarma, Sanjay et al., Design Of An Autonomous Fixturing System Using RFPE Techniques, OE Reports, Oct. 1997.

Guevara, Ceani, Development Of The Process Parameter Map For Reference Free Part Encapsulation, M.I.T. M.S.M.E. Thesis, Jun. 2001.

DO, A., et al."Latest-Generation SLA Resins Enable Direct Tooling for Injection Molding," Plastics Insights, vol. 5, No. 3, Oct. 16, 2006 [Retrieved Mar. 17, 2008 from the internet <URL http://www.cs.berkeley.edu/~sequin/PAPERS/2006_DoWrSq_InjMold.pdf>].

* cited by examiner

METHOD OF MACHINING A PART

CROSS-REFERENCE TO RELATED APPLICATION(S)

None.

BACKGROUND OF THE INVENTION

The present invention relates to the field of prototype or low volume part making, and particularly to total profile machining of parts such as from blocks of plastic materials using CNC machines, wherein a substantial majority of the surface area of the part is created by the CNC machining.

With the quickening pace of product design schedules, the fast turn-around production of low quantity or prototype parts for testing new designs has become more and more common. Product designers need to move from the drawing board (or, in today's world, the computer screen) to having an example product in hand within weeks if not days. To meet these rapid schedules, many designers have turned to the field of rapid prototyping, to quickly turn their written design drawings into a physical part specimen. Most common rapid prototyping techniques are additive processes, wherein material is added in layers or voxels in the shape desired of the part. Examples of common rapid prototyping techniques include stereo lithography (SLA for stereo lithography apparatus), selective laser sintering (SLS), fused deposition modeling (FDM), laminated object manufacturing (LOM), inkjet-based systems and three-dimensional printing (3DP).

Many rapid prototyping techniques are expensive, and produce a part which, though dimensionally accurate even for many complex geometries, does not have the physical attributes desired of the final part. Due to the expense on a per part basis, most rapid prototyping techniques are only used for low-volume runs of a part (such as a quantity of 10 or fewer), and not for mid- or high-volume part runs. Lower cost methods of fabricating single part or low-volume runs, which more accurately reflect the physical attributes of the production-run part, are desired.

Machining has long been used to shape metal, wood, plastic and similar solid materials into parts. Machining involves a subtractive process, wherein a solid block of material is held or fixtured in to the tool, and the block is reamed, drilled, sawed, lathed, cut or similarly shaped by removing material from the block to form the shape desired. Computer Numerical Control ("CNC") machining has accelerated the machining process and become commonplace in many part-making and machine shops. CNC machining requires the writing of code to instruct the CNC machine which tools and tool paths are needed for the material removal steps. The process for generating CNC tool paths can be simple or difficult depending upon the complexity of the tool paths. For simple profiles, typically having a rectangular or box-like shape which can be readily held with vices on the CNC machine, CNC machining may be a viable option, either in low-, mid- or high-volume runs. As part shape profiles and geometries are designed to be more complicated, CNC machining often requires the creation of custom fixtures for holding the part during machining. It is not unusual for the design and fabrication of the custom fixturing to involve more time and expense than the design and fabrication of a single part itself. With the added time and complexity associated with custom fixturing, CNC machining is rarely used for low-volumes of parts having more complex shapes which need to be fabricated in a quick turn-around time. For parts in mid- or high-volume runs, the design and fabrication of custom fixtures may be warranted, making machining again a viable option depending upon part shape.

Even with custom fixturing, if the machining time for the part takes too long, often other methods of part manufacture will be more cost effective than "total profile" machining, i.e., machining a substantial majority of the surface area of the part in the CNC machine.

Injection molding, among other types of molding techniques, is commonly utilized to produce plastic parts from molds. Once the injection mold is created and the injection mold press is properly set up, injection molding can quickly create parts of complex geometries in quick succession to reach high-volume runs. The work of companies such as The Protomold Company, Inc. of Maple Plain, Minn. has applied CNC machining and computer analysis techniques to mold-making, and can make injection molds and injection molded parts in an impressive turn-around time for many plastic parts required in low (for instance, 10 or fewer parts) or mid-range (10 to 10,000 parts) volumes. If warranted by volume needs, more elaborate injection molds (typically of tool steel) can be fabricated for higher volumes of injection molded parts, generally with a greater lead time. Because injection molded parts from The Protomold Company, Inc. are formed of the identical material and by the same technique (injection molding) which would commonly be used for high-volume production runs, such parts are often superior to rapid prototyped parts.

While injection molded parts from The Protomold Company, Inc. can be achieved at a much lower cost than previously, the cost of one or two parts still requires creation of the injection mold and its associated cost. In cases where only one or several units of a part are required, further cost reductions would be beneficial.

BRIEF SUMMARY OF THE INVENTION

The present invention involves a method and apparatus for total profile machining of a part. A block of material is CNC machined to define a first side of the part and an encircling recess. A registration/potting fixture is placed into the encircling recess. The registration/potting fixture is used to pack potting or fluid support material against the machined side of the part, under conditions which may include a pressure pack, degassing of the potting compound, and/or evacuating air from the machined side prior to or during potting. The potting material is solidified, which may be accelerated by cooling the registration/potting fixture. Then the registration/potting fixture is used to fixture the block in a new orientation in the CNC machine. Another side of the part is CNC machined. The potting material is removed from the part to free the part for shipment to the customer.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
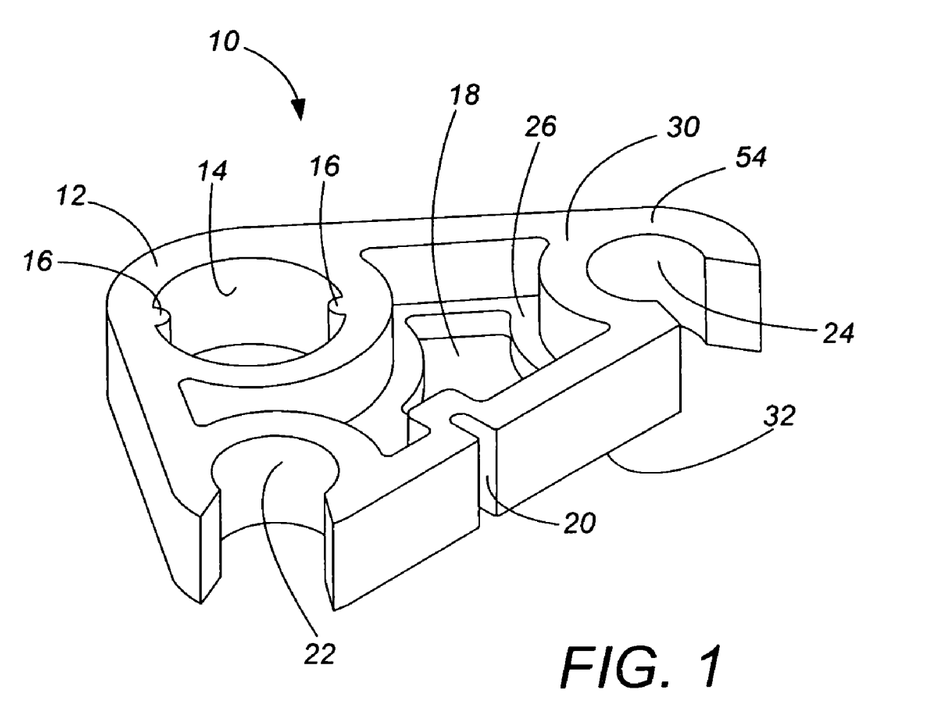
FIG. 1 is a perspective view of an exemplary "cam" part desired by a customer.

The present invention will be described with reference to an exemplary part 10 shown in FIG. 1. FIG. 1 represents a "cam" part 10 designed by the customer. In part because the cam 10 is custom-designed (i.e., not a staple article of commerce) by or for this particular customer, the cam 10 includes numerous features, none of which have commonly accepted names. For purposes of discussion, we will give names to several of these features, including a part outline flange 12, a circular opening 14 with two rotation pins 16, a non-circular opening 18, a notch 20, two corner holes 22 and 24, and a partial web 26. However, workers skilled in the art will appreciate that the customer may in fact have no name or may have a very different name for any of these features.

A software system (not shown) may be used to receive the CAD part data file from the customer and perform analysis thereon, which software system may incorporate features as disclosed in U.S. patent application Ser. No. 11/369,120, 11/368,590, 11/338,052, 60/736,597, 60/736,199, 11/114,893 (now issued as U.S. Pat. No. 7,089,082), Ser. No. 11/074,388 (now issued as U.S. Pat. No. 7,123,986), Ser. Nos. 11/035,648, 10/970,130, 10/325,286 (now issued as U.S. Pat. No. 6,836,699), and Ser. No. 10/056,755 (now issued as U.S. Pat. No. 6,701,200), all owned by the assignee of the present invention (The Protomold Company, Inc.) and all incorporated herein by reference. These listed applications are collectively referred to herein as the "Protomold patented system applications", and the teachings of these listed applications are collectively referred to herein as the "Protomold patented system". The features of the Protomold patented system can be used directly or modified to cover the machining of a part as disclosed herein. The present invention further finds application even if toolpaths are created using traditional techniques, or if the "customer" is a part designer working within the same company (or even the same person) as the individual running the CNC machine.

Of particular significance, the customer identifies the shape of the part 10 as well as the material from which the part 10 is to be machined. For instance, polymer material blocks 28 may be kept in stock for any of the following types of material: Acetal (including Copolymer or Homopolymer—DELRIN, SUSTARIN, ULTRAFORM, ENSITAL, POMALUX, TURCITE, ACETRON, TECAFORM or ERTACETAL), Acrylic or Acrylic+PVC (KYDEX or PLEXIGLASS), ABS (ABSYLUX, ENSIDUR or TECARAN), Chlorinated PVC, Cyclic Olefin Copolymer (TOPAS), ETFE (TEFZEL), Fiberglass, HDPE (SANALITE or SEABOARD), Laminates (FR-4, FR-5, G-3, G-5, G-7, G-9, G-10, G-11 or CIP) Machinable Glass Ceramic (MACOR), Nylon (ENSILON, ERTALON, NYLOIL, NYLATRON, TECAMID or TECAST), Perfluoralkoxy (TEFLON), Phenolic (BAKELITE, MICARTA or NORNEX), PAI (TORLON or TECATOR), Polyarylate (ARDEL), PBI (CELAZOLE), PBT (HYDEX), PBT+PC (XENOY), PC (LEXAN, MAKROLON, ENSICAR, ZELUX, HYZOD, MACROLUX, TUFFAX or TECANAT), PCTFE (KEL-F), Polyester (ENSITEP or TECADUR), PEI (ULTEM, SUSTATED PEI, TEMPALUX or TECAPEI) PEEK (SUSTATEC, TECAPEEK or KETRON), PES (RADEL A or TECASON), Polyethylene (TECAFINE or CESTALINE), ECTFE (HALAR) PET (ERTALYTE, SUSTADUR or TECADURE), PETG (SPECTAR or VIVAK), Polyimide (SINTIMID, DURATRON, MELDIN, VESPEL or KAPTON), PMMA Acrylic (PLEXIGLASS, OPTIX), PMP (TPX), Polyparaphenyl (TECAMAX), PPO (NORYL or TECANYL), PPS (RYTON, TECHTRON, ENSIFIDE or TECATRON), PPSU (RADEL R), PP (including Copolymer or Homopolymer—ENSIPRO, PROPYLUX or TECAPRO), PS (REXOLITE), PSU (UDEL, TECASON or MINDEL), Polyurethane (ISOPLAST), PTFE (TEFLON, RULON, FLUORSINT or TECAFLON), PVC (TECAVINYL), PVDF (ENSIKIKEM, KYNAR or SYMALIT), UHMW Polyethylene (ENSICAR, TIVAR, LENNITE or TECAFINE), or other similar materials, in a range of various colors, fills and grades of these materials. All of these materials have in common that they are solid at room temperature and can be readily machined at room temperature, and are relatively inexpensive in block form (so machining waste is not prohibitively expensive). Further, all of these materials are sufficiently soft relative to machine tools and have a sufficiently low coefficient of thermal conduction so as not to overly soften or melt the preferred potting materials during machining the B-side 32 of the part 10 as will be subsequently explained.

The present invention could further be used for machining an even wider variety of materials, including metals (such as aluminum), organics (such as wood), minerals (such as granite), ceramics or composite materials. If temperature controls are added to the manufacturing environment and appropriate potting materials are used, the present invention can be used for yet a wider range of materials which may not be solid at room temperature, such as ice which must be kept frozen prior to and during machining. However, a primary application of the present invention involves machining of thermoplastic polymers such as those listed above. Regardless of what material is selected, the term "workpiece" material is used herein to refer to the solid material which is being machined to form the part.

The shape of the part 10 is checked to verify that it can be CNC machined, preferably with a standard CNC tool set, in a reasonably limited number of orientations. With the cam part 10 of FIG. 1, the part 10 can be CNC machined in two orientations, basically the "front" or "A-side" 30 and the "back" or "B-side" 32 of the cam 10. The front side 30 and the back side 32 of the cam 10 correspond to the A-side and the B-side of the mold if the part 10 were to be molded using the Protomold patented system, with the separation line between the front side 30 and back side 32 of the part 10 corresponding to the parting line between the A-side and B-side of the mold. While the A-side could face at an angle relative to the B-side, for most applications the A side of the part faces 180° opposite the B-side. For the cam 10 and for many parts, only two opposing orientations are needed. Other, more complicated parts may involve further orientations, which would correspond to side actions in the Protomold patented system.

Figure 2:
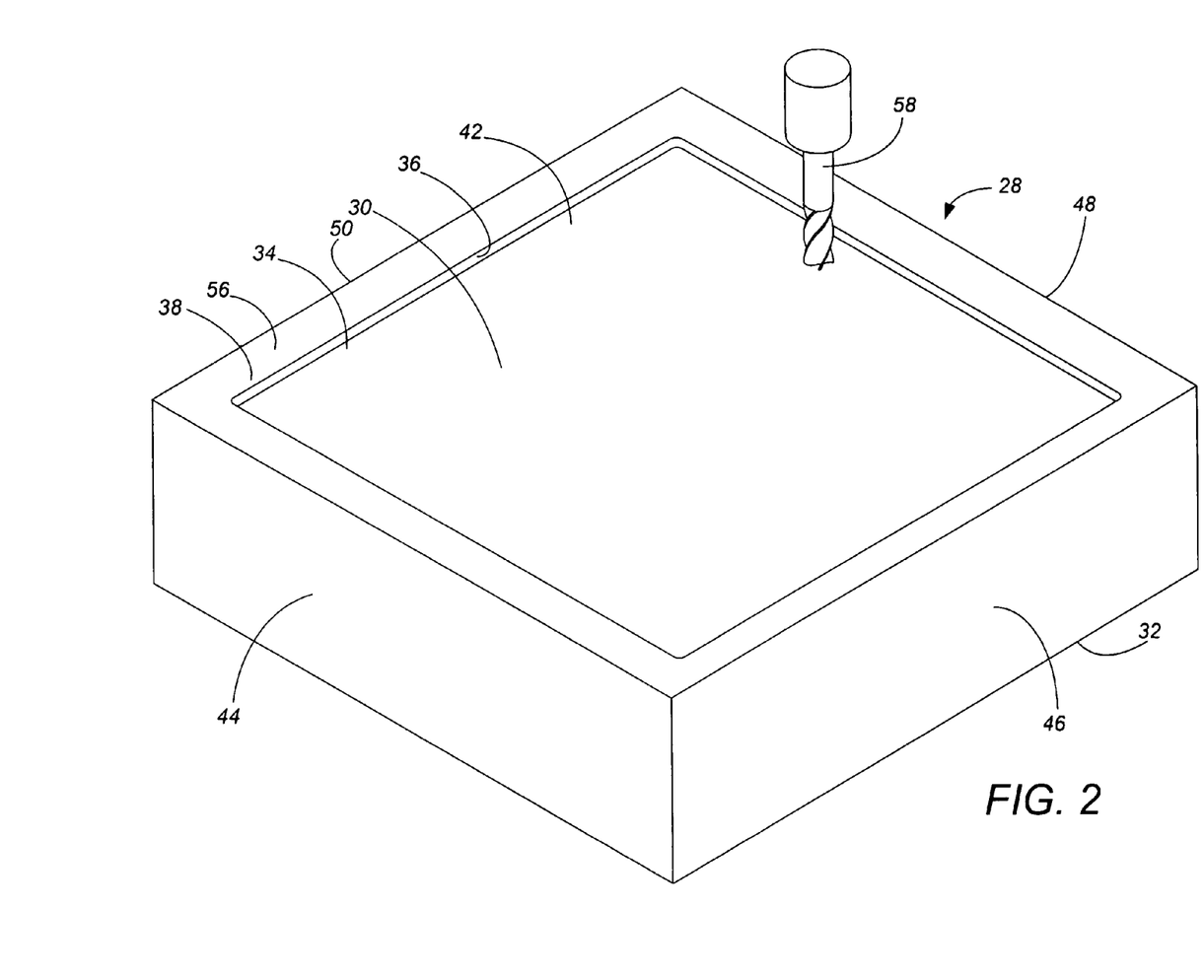
FIG. 2 is a perspective view of CNC machining a registration recess into a block of material.

The part 10 is also checked to verify that it fits within a standard sized block of workpiece material, such as the roughly 6×6×2 inch block 28 shown in FIG. 2. This step corresponds to verifying that the part 10 can be molded in a standard mold block size in the Protomold patented system. The size of the part 10 is only limited by the sizes of workpiece material blocks available and the maximum sizes handled by the CNC machine used. However, machining of the part 10 will require a selection of a block 28 of workpiece material and an appropriately sized registration/potting fixture (explained below), and it is better to inform the customer of an inconvenient or costly size of the part 10 before commencing machining. The term "block" as used herein is not intended to be limiting as to the shape, but rather to designate whatever solid shapes of workpiece material are available for the machining operation.

CNC tool paths are generated to machine the part 10. The CNC tool paths correspond to a negative image of the material removal tool paths generated in the Protomold patented system to machine the mold. The CNC tool paths for machining the part 10 are also generated in the opposite orientation as the CNC tool paths generated in the Protomold patented system to machine the mold. That is, while CNC tool paths generated in the Protomold patented system are generally oriented away from the parting line, CNC tool paths for machining the part 10 are generated oriented toward the separation line between the A-side 30 and the B-side 32 of the part 10.

The first step in machining a block 28 of workpiece material into the cam 10 is shown in FIG. 2. A registration recess 34 is machined into the A-side 30 of the block 28 of workpiece material from which the part 10 will be total profile machined. The registration recess 34 is preferably bounded within the block 28 of workpiece material and thus defines a peripheral wall 36. The registration recess 34 is removed from the profile of the part 10, i.e., non-intersecting with any of the exterior surfaces of the part 10. While the registration recess could be defined with the peripheral wall facing outward, the preferred registration recess 34 faces inward, so the workpiece material to the inside of the peripheral wall 36 of the registration recess 34 is cut away shorter than the encircling remainder 38 of the block 28. The registration recess 34 encircles the part 10 in the sense that it provides sufficient structure to completely define the position of the registration/potting fixture 40 which will be placed therein as discussed below. While the registration recess could partially encircle the part 10 and still be effective, the preferred registration recess 34 provides a peripheral wall 36 which completely encircles the part 10. To minimize waste, the registration recess 34 preferably has a plan shape similar to the plan shape of the block 28 of workpiece material.

The preferred registration recess 34 is rectangular and has a planar bottom surface 42. The location of the registration recess 34 with respect to the sides 44, 46, 48, 50 of the block 28 is not particularly important, so the original dimensions of the block 28 and the act of locating and fixturing the block 28 in the CNC machine during this stage of the machining process is not critical. The rectangular shape of both the block 28 of workpiece material and the registration recess 34 assists in minimizing waste and making it simple to fixture the block 28 into the CNC machine such as by using a vice (not shown) and fence (not shown) of the CNC machine. As shown, the registration recess 34 is offset slightly closer to the left wall 44 and the front wall 46 than to the right wall 48 and the back wall 50. This offset may have been due to the original block 28 being wider or taller than specified nominal dimensions, such as due to a wide tolerance on forming or sawing the workpiece material into the block shape shown. This offset may separately be due to fixturing the block 28 of workpiece material slightly off-center in the CNC machine. Either way, all subsequent machining operations will be located based from the location of the registration recess 34, not based upon the walls 44, 46, 48, 50 of the block 28, and the exact location of the registration recess 34 relative to the walls 44, 46, 48, 50 of the block 28 is not critical. FIG. 2 shows an exemplary registration recess 34 of a 5×5 inch square. Another preferred registration recess is a 4.5×5 inch rectangle which is 0.125 inches deep. It will be understood that a wide variety of other shapes and dimensions of registration recesses could be alternatively used, provided the registration/potting fixture (described below) matches the registration recess.

Figure 3:
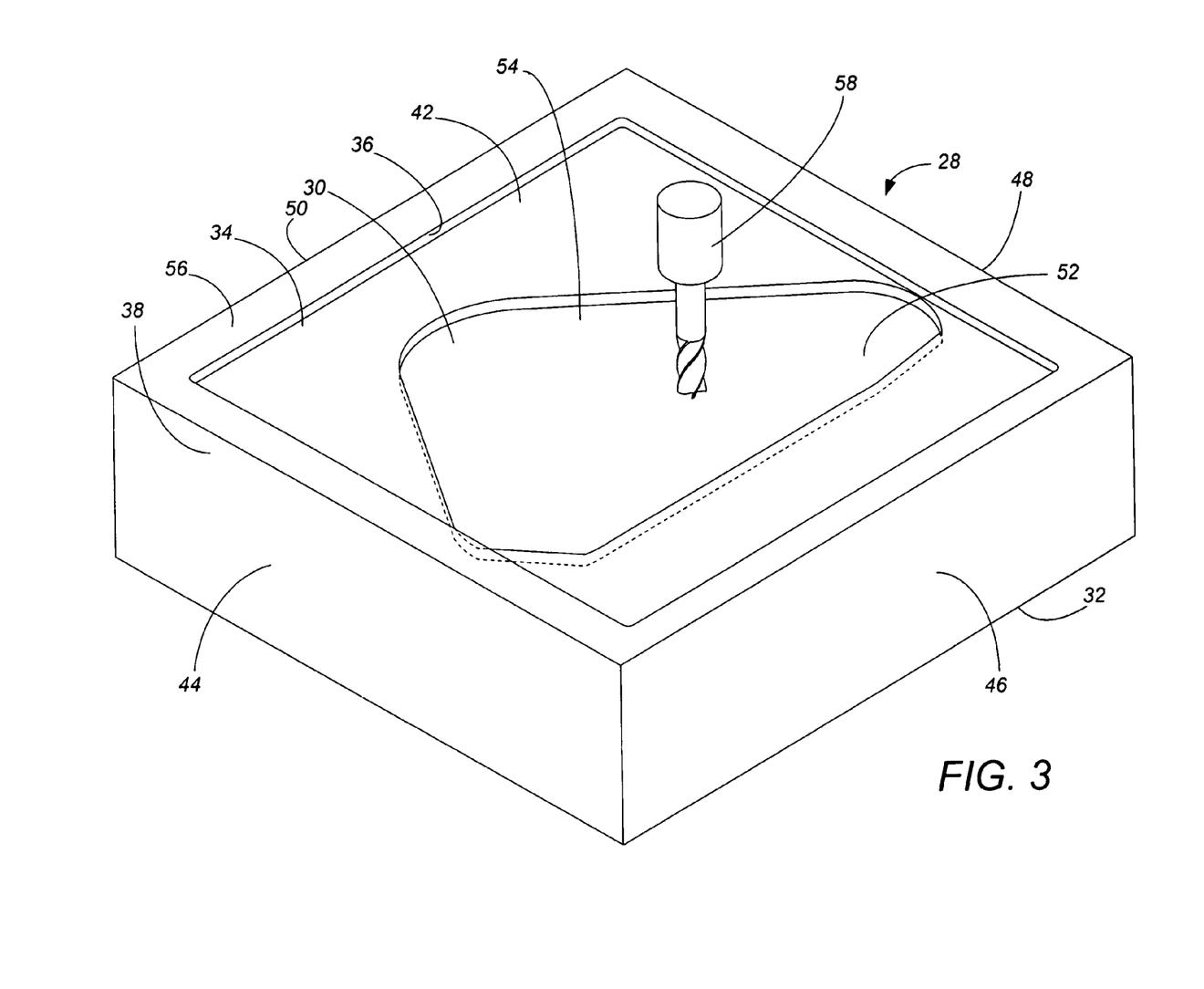
FIG. 3 is a perspective view of CNC machining a recessed upper face of the part in the block of material.

The next step in the CNC machining operation is to machine a set-off 52 over the A-side 30 of the part 10 as shown in FIG. 3. The set-off depth is preferably chosen to permit flow of the potting material during the potting operation to move over the A-face of the part 10. The preferred set off depth is about 0.2 inches deep, such as by using a mill 58 to cut down to the top surface 54 of the part outline flange 12 of the cam 10. Alternatively, the part 10 may be positioned as close as possible to the top 56 of the block 28 of workpiece material, in which case the registration/potting fixture (described below) would alternatively have a recess for potting material flow over the A-side 30 of the part 10. Regardless, it is preferred to CNC machine the top surface 54 of the part 10 to accurately locate the top surface 54 of the part 10 relative to the registration recess 34, and to remove any non-planarity or defects in the surface 56 of the workpiece material block 28. The set-off 52 is preferably wider than the part profile in plan view by a margin corresponding to the tools which will be used to machine the A-side profile of the part 10, such as a ¼ inch clearance for a ¼ inch diameter end mill 58. Depending upon the depth required for the A-side 30 of the part 10, the set-off 52 may need to be wider to account for the collet of the tool 58. The set-off 52 and tools chosen also preferably fit within the plan view of the registration recess 34, so machining the set-off 52 does not overlap or cut into the peripheral wall 36 of the registration recess 34.

Figure 4:
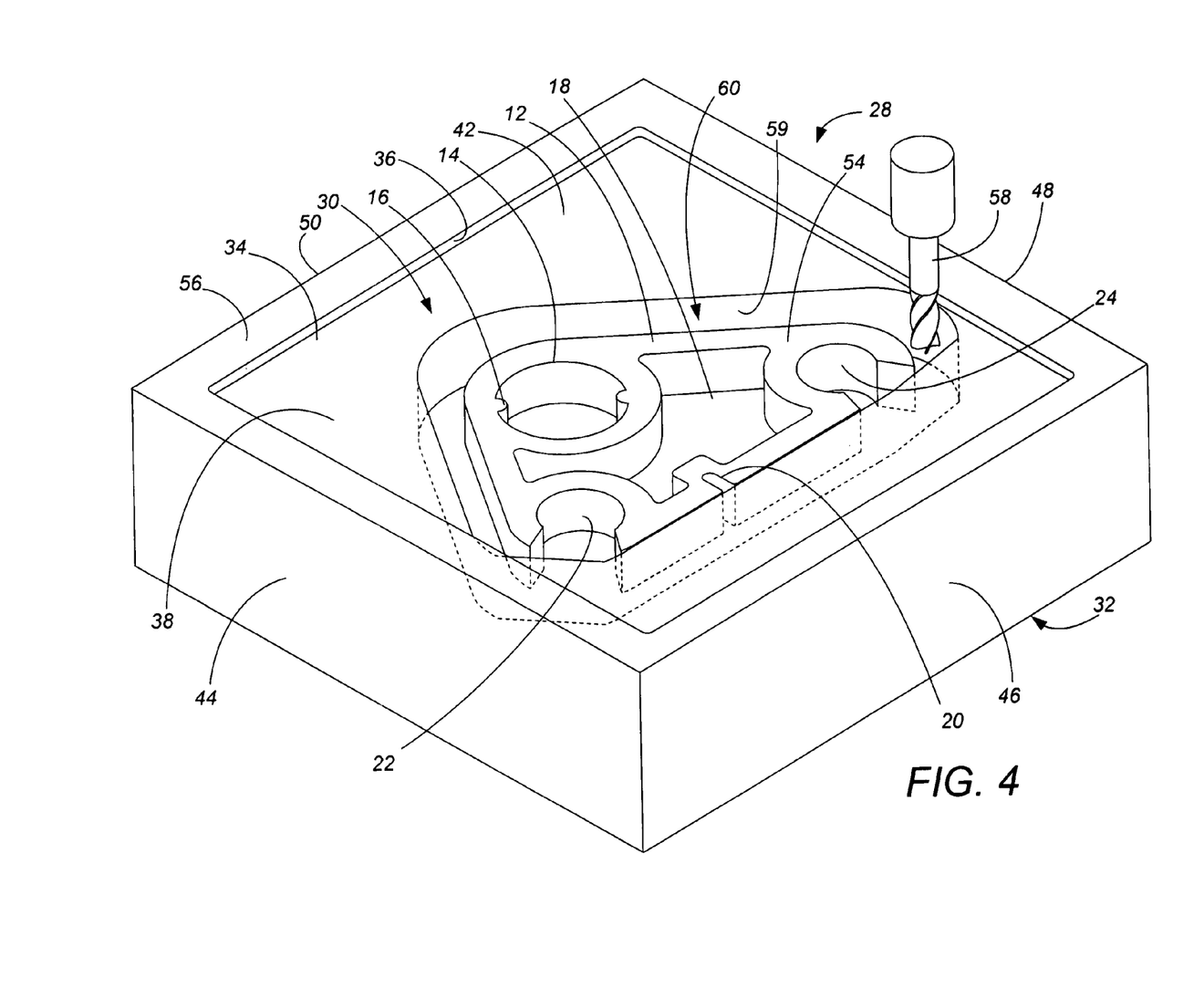
FIG. 4 is a perspective view of CNC machining further features of an "A" side of the part in the block of material.
Figure 5:
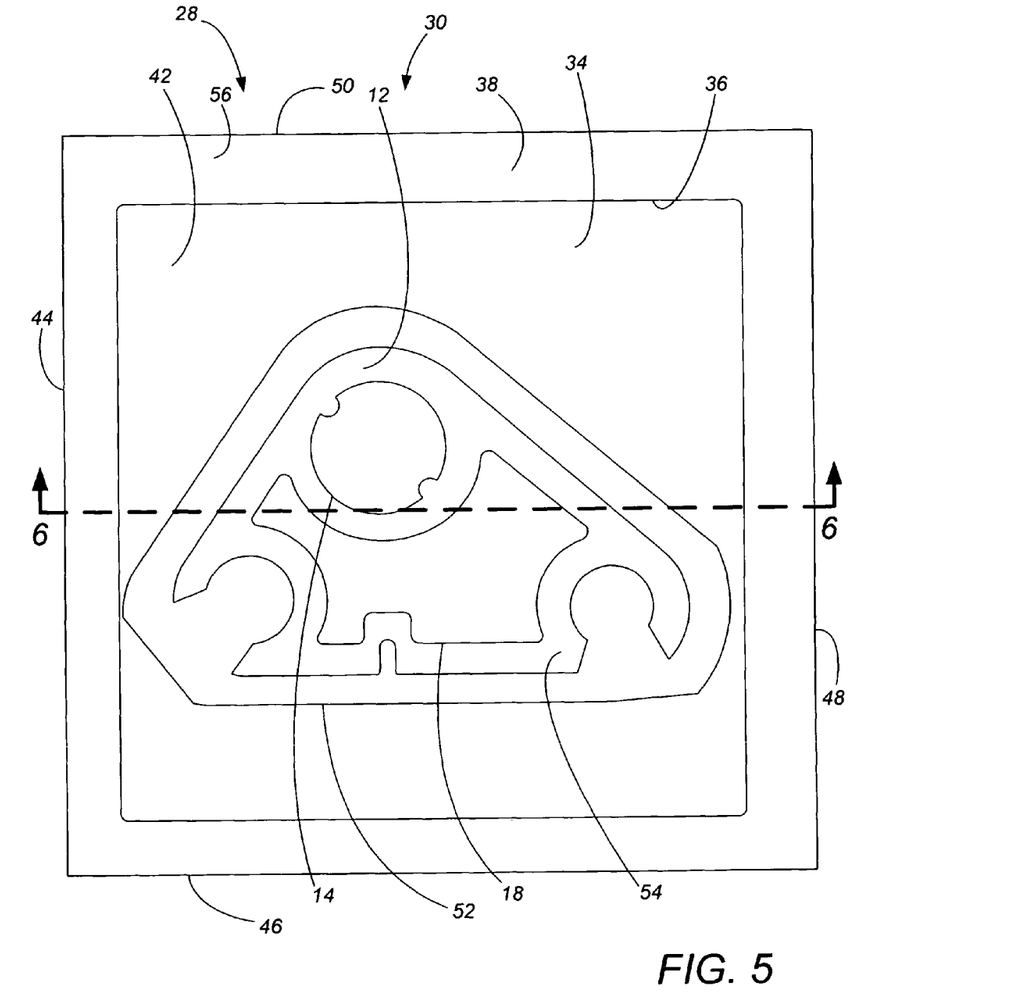
FIG. 5 is an A-side plan view of the block of FIG. 4.
Figure 6:
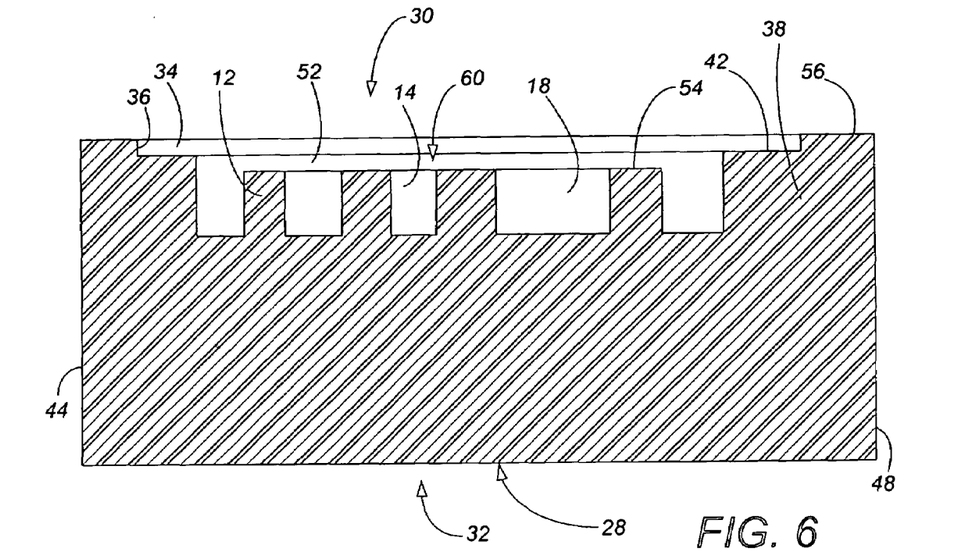
FIG. 6 is a cross-sectional view taken along lines 6-6 in FIG. 5.

Once the set-off 52 has been machined, the CNC machining operation continues to define side wall profiles of the A-side 30 of the part 10 as shown in FIGS. 4-6. During this machining operation for the cam 10, the flange 12, the circular opening 14 with two rotation pins 16, the non-circular opening 18, the notch 20 and the two corner holes 22 and 24 all become visible, but not to their full thickness. The partial web 26 and the full depth of the non-circular opening 18, in particular, fall on the B-side 32 of the part 10 and are not yet machined. With none of the B-side 32 of the part 10 yet machined, there are no problems with vibration or deflection of the part 10 during machining. While the cam part 10 shown has no surfaces angled relative to the z-direction of the CNC machine, any angled surfaces could easily be machined into the A-side 30 of the part 10 provided the surface is accessible with a CNC tool given the block orientation. Additionally, in many instances it is beneficial to draft or step the outside surface 59 which connects to the set-off 52. If the outside surface 59 is drafted or stepped, the possibility of the potting material 68 (described below) separating from the encircling remainder 38 of the block 28 and pulling through during B-side machining is eliminated or greatly reduced.

While the cam part 10 shown has no features which cannot be injection molded, it should be noted that machining of the outer profile of the part 10 permits exterior features which would typically be machined even into an injection molded part. A common example is a hole or bore which is tapped or threaded. If injection molding is used to create the part, after injection molding the part will typically be further machined to cut threads into the hole. Because the present invention uses machining to create the substantial majority of the outer profile of the part, threading on the holes can be simply fabricated as part of the CNC machining operation, i.e., without requiring a separate and distinct manufacturing process.

The part 10 does not need to be moved or fixtured again with respect to the CNC machine, but rather the same fixturing (not shown) for the block 28 can be used for the A-side machining as was used for the registration recess 34, without moving the part 10.

Regardless of tolerances on the block walls 44, 46, 48, 50 or how the block 28 is located on the CNC machine, the A-side 30 of the part 10 is machined in the exactly defined location relative to the registration recess 34 because the block 28 was not moved in between the machining operations. Thus, even though some aspects of the present invention could be used to obtain an even better turn-around time by machining registration recesses (and if desired set-offs) into blocks and maintaining an inventory of such blocks prior to receipt of the CAD data file and CNC machining the A-side of the part, the preferred method is to do all A-side CNC machining in a single placement and fixturing of the block 28 into the CNC machine.

Figure 7:
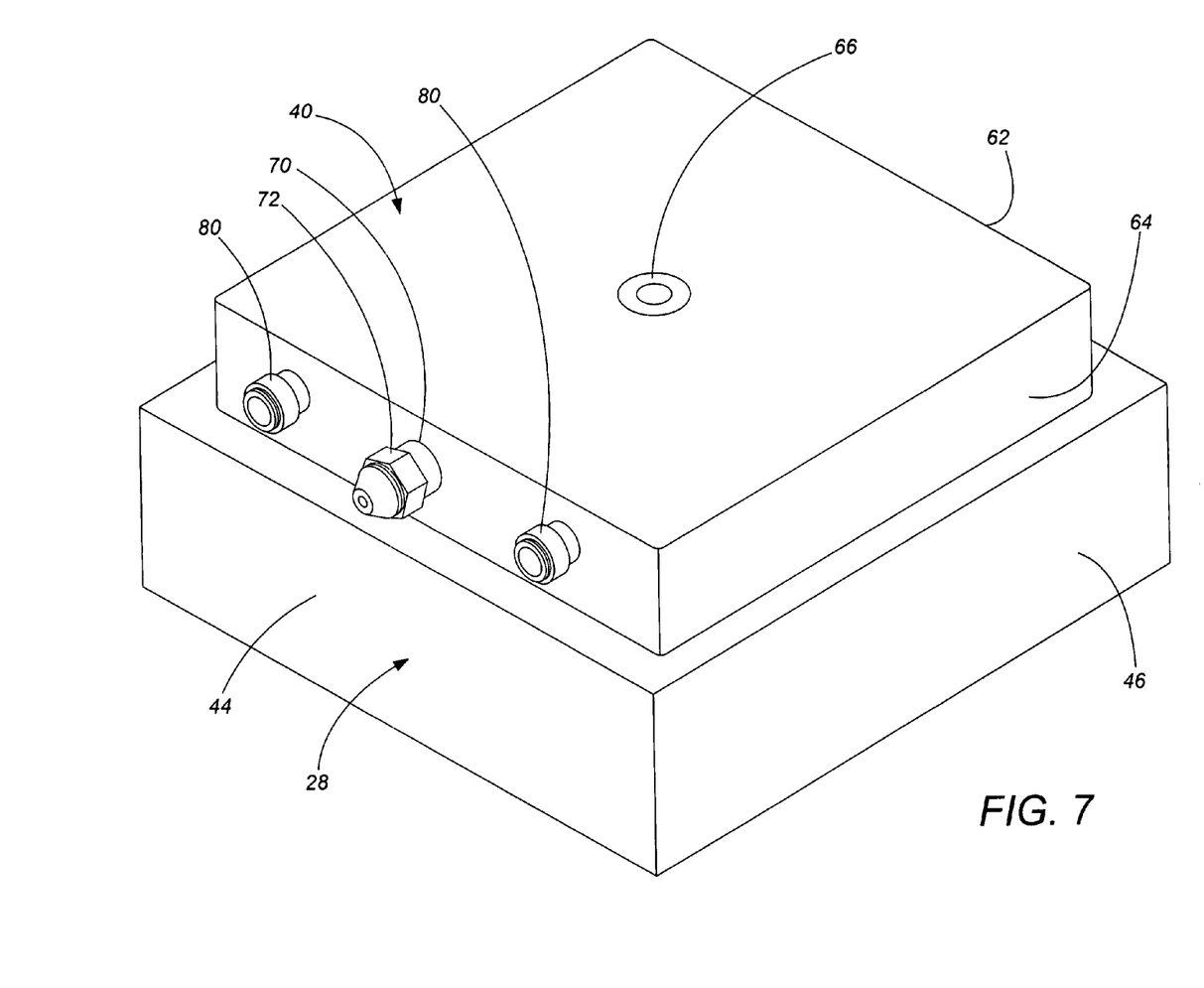
FIG. 7 is a perspective view of a potting/registration fixture in the registration recess.
Figure 8:
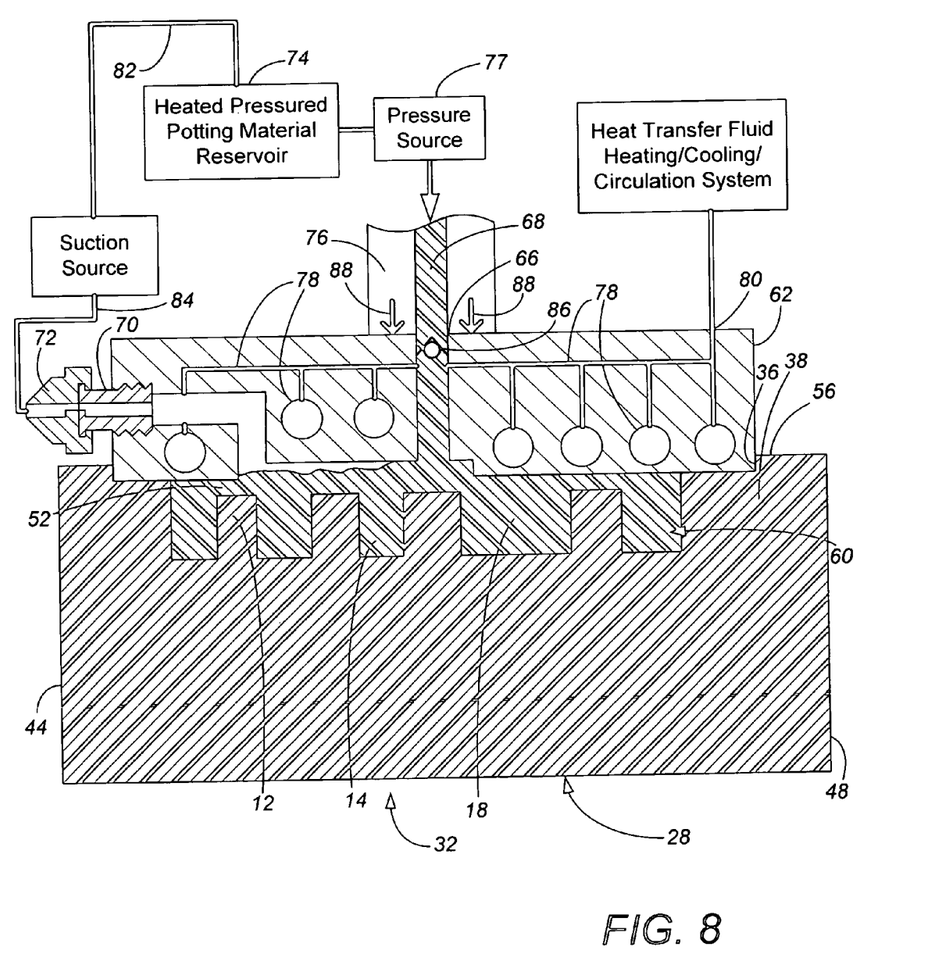
FIG. 8 is a cross-sectional view taken at the same (lines 6-6) cut location as FIG. 6 during potting using the potting/registration fixture.

Once the A-side 30 of the part 10 has been machined, a registration/potting fixture 40 is placed into the registration recess 34 as shown in FIGS. 7 and 8, fully defining an A-side cavity 60. The registration recess 34 is machined to mate tightly with the registration/potting fixture 40. The preferred registration/potting fixture 40 mates identically into the 5×5 inch registration recess 34 shown. However, the shape of the registration recess 34 is not as important as the fact that the registration recess 34 is defined to be a size and shape which mates with the size and shape of the registration/potting fixture 40. The portion of the registration/potting fixture 40 outside the registration recess 34 preferably includes opposing exterior walls 62, 64 at right angles, such as the rectangular shape shown, which assist in subsequent fixturing of the part 10 for B-side machining.

The registration/potting fixture 40 includes a potting inlet 66 for receiving fluid potting compound 68 and an air bleed outlet 70. The preferred potting inlet 66 is positioned on the top side and center of the registration/potting fixture 40, minimizing the travel distance for fluid potting compound 68. A shorter travel distance is preferred because it minimizes problems associated with premature solidification of the potting compound 68 before the cavity 60 is completely filled and packed. After the registration/potting fixture 40 is in place, potting compound (support material) 68 is injected through the potting inlet 66 into the cavity 60 defined on the A-side 30 of the part 10 underneath the registration/potting fixture 40. The fluid potting material 68 fills this cavity 60, and air is pushed out of the cavity 60 through the air bleed outlet 70. The air bleed outlet 70 preferably includes a valve 72 which can be shut off once all the air is removed from the A-side cavity 60 and fluid potting material 68 has completely filled the space between the registration/potting fixture 40 and the A-side 30 of the part 10.

The potting material 68 is selected based upon the support characteristics and solidification characteristics desired for the workpiece material of the block 28. For many of the plastic workpiece materials contemplated for the primary application of the present invention, a preferred potting material 68 is a water soluble RIGIDAX wax available from M. Argueso & Co., Inc. of Muskegon, Mich. RIGIDAX is promoted as a castable, thermoplastic compound for stabilizing, supporting and holding hard-to-fixture, thin wall, odd shaped and non-magnetic parts. The water soluble RIGIDAX has a recommended pour temperature of about 180° F. but is solid at room temperature. Another preferred potting material is VFW-148 wax from Westech Products of Corona, Calif. Other potting or support materials could alternatively be used.

The machine for injecting the potting material 68 through the registration/potting fixture 40 can be substantially as disclosed in U.S. Pat. No. 6,688,871 and WO 01/15850, incorporated by reference. Generally and as shown schematically in FIG. 8, it includes a reservoir 74 of heated potting material 68 piped to a connection 76 with the inlet port 66 of the registration/potting fixture 40. A cylinder or other pressure source 77 may be used to pressure the fluid potting material 68 into the cavity 60 defined between the A-side 30 of the part 10 and the registration/potting fixture 40. Once potting material 68 begins to be pressed through the air bleed outlet 70, the air bleed valve 72 is closed. At this point, the fluid potting material 68 may be further pressured to pack the fluid potting material 68 and account for contraction of the fluid potting material 68 during solidification. In the preferred embodiment, the fluid potting material 68 is packed at a pressure of over 25 psi, such as within the range of 25-400 psi, and more preferably within the range of 100-300 psi. The packing pressure is preferably selected based upon the potting material chosen, the workpiece material chosen, and the shape of the part.

The preferred registration/potting fixture 40 is formed of a thermally conductive, dimensionally stable metal, such as tool steel. During solidification of the fluid support material 68, a substantial amount of heat is drawn from the fluid support material 68 by way of conduction through the registration/potting fixture 40. To further enhance the heating/cooling effects of the registration/potting fixture 40, the preferred registration/potting fixture 40 includes channels 78 (shown partly in schematic in FIG. 8) and associated ports 80 (shown in FIG. 7) for liquid heating and/or cooling of the registration/potting fixture 40. In the preferred method, the registration/potting fixture 40 is heated to the reservoir temperature prior to injecting the potting material 68 through the registration/potting fixture 40. Once the potting material 68 fills the cavity 60 and is packed, the registration/potting fixture 40 is cooled such as by drawing liquid coolant through the channels 78 and associated ports 80, increasing the solidification rate of the potting material 68. Other heating and/or cooling mechanisms, such as electric resistance heaters, may be equivalently provided.

With this heating and cooling provided by the preferred registration/potting fixture 40, the support material 68 fully solidifies in a time which is on the order of or less than the time required to CNC machine the part 10. For instance, for typical parts, CNC machining of the A-side of the part will be performed in about 10-120 minutes, and injection and solidification of the potting material 68 can be achieved in about 10-30 minutes. Of course, the amount and complexity of the machining depends heavily on the part shape, and the time required for solidification of the potting material 68 depends heavily on the volume of the A-side cavity 60 and the contact area between the potting material 68 and the registration/potting fixture 40, and so can vary substantially for differently shaped parts. The largest delay time of solidification is associated with the large volume of potting material which can be used, depending upon the profile of the part. If a shorter solidification time is desired, other cooling techniques can be used, such as extensions (not shown) of the registration/potting fixture 40 which can be adjustably moved into the cavity 60 and closer to the part surface, thereby reducing the volume of potting material used and increasing the conduction from the center of the potting material volume.

Two vacuum features have been found to significantly enhance the quality of the potting material pack about the A-side 30 of the part 10. First, a vacuum 82 is drawn against the molten potting material 68 in the reservoir 74 for a period of time prior to injection through the registration/potting fixture 40. The vacuum 82 or negative pressure drawn on the molten potting material 68 is believed to draw gasses out of the potting material 68 which otherwise interfere with the integrity of the support material 68 when it solidifies.

A second negative pressure 84 is separately applied to pull air out of the cavity 60 prior to injection of the potting material 68. With negative pressure 84 removing the majority of the air from the cavity 60, the injected potting material 68 seems to pack better and form a better seal with the A-side 30 of the part 10 and the encircling A-side block material 38. The negative pressure 84 drawing air out of the cavity 60 can be easily achieved through the bleed valve 72 and by including a check valve 86 (shown schematically in FIGS. 8-10) on the potting material inlet port 66. Alternatively, the suction 84 drawing air out of the cavity 60 can be done only after the melt head 76 is applied to the potting material inlet 66.

To sustain a negative pressure, the contacting surfaces between the registration/potting fixture 40 and the registration recess 34 need to mate very tightly, such as with a press fit. An air-tight fit between the registration/potting fixture 40 and the registration recess 34 is enhanced by having flat planar surfaces and by using the potting machine to push the registration/potting fixture 40 and the registration recess 34 under some force, as shown by arrows 88.

Figure 9:
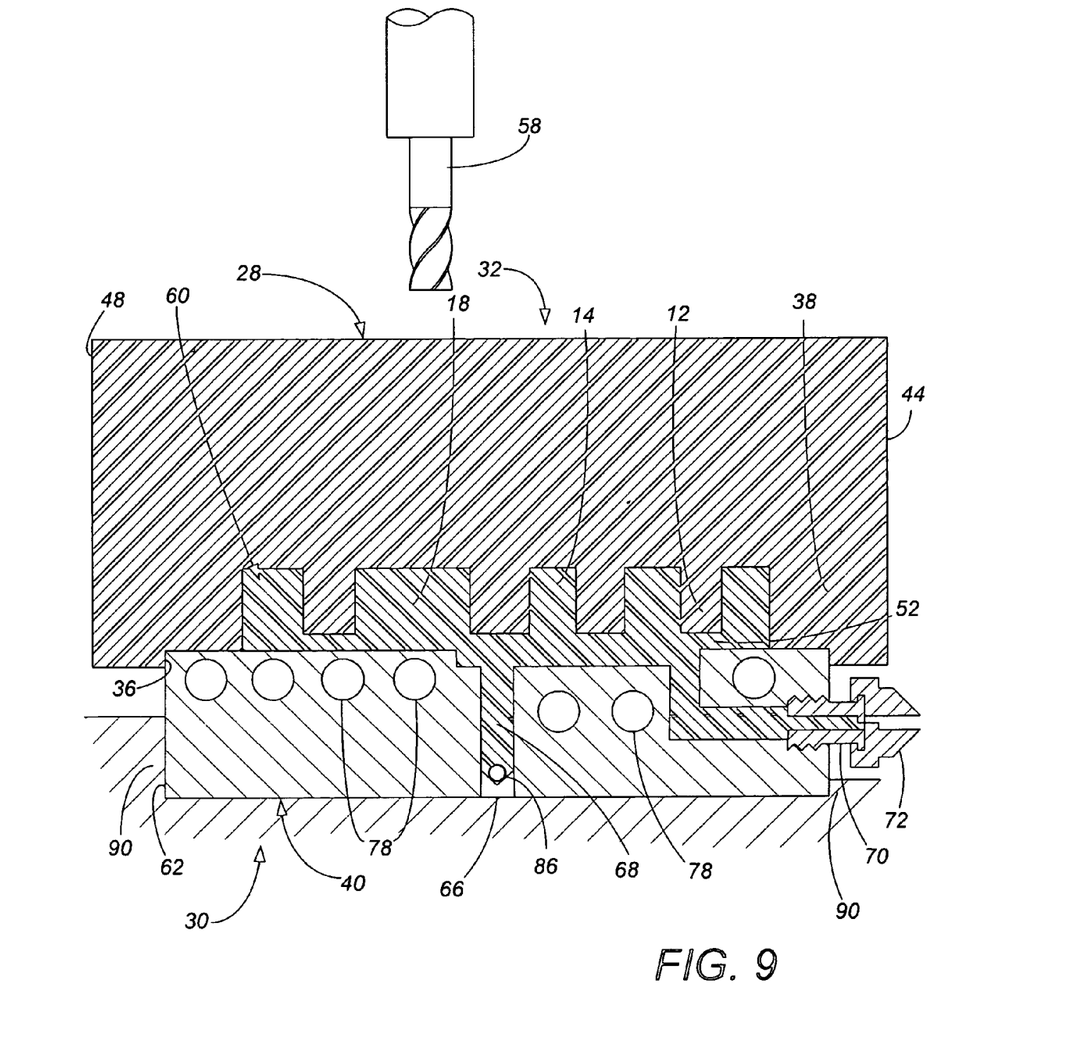
FIG. 9 is a cross-sectional view taken at the same (lines 6-6) cut location as FIG. 6 during placement and fixturing of the block for further CNC machining.

Once the potting material 68 has been injected, packed and solidified about the A-side 30 of the part 10, the block 28 is removed from the potting machine with the registration/potting fixture 40 and potting material 68 in tact. As shown in FIG. 9, the fixture/block combination is then reoriented such as being flipped over, and the fixture 40 is used in positioning the block 28 in the CNC machine for machining the B side 32 of the part 10 in the new orientation. Because the dimensions of the registration/potting fixture 40 are known and established for all parts irrespective of the shape of the part, the fixturing 90 can be preset, and securing the registration/potting fixture 40 into the CNC machine can be easily performed, such that the reorientation of the block 28 is accurately and identically established for all parts based upon the location of the registration recess 34.

Figure 10:
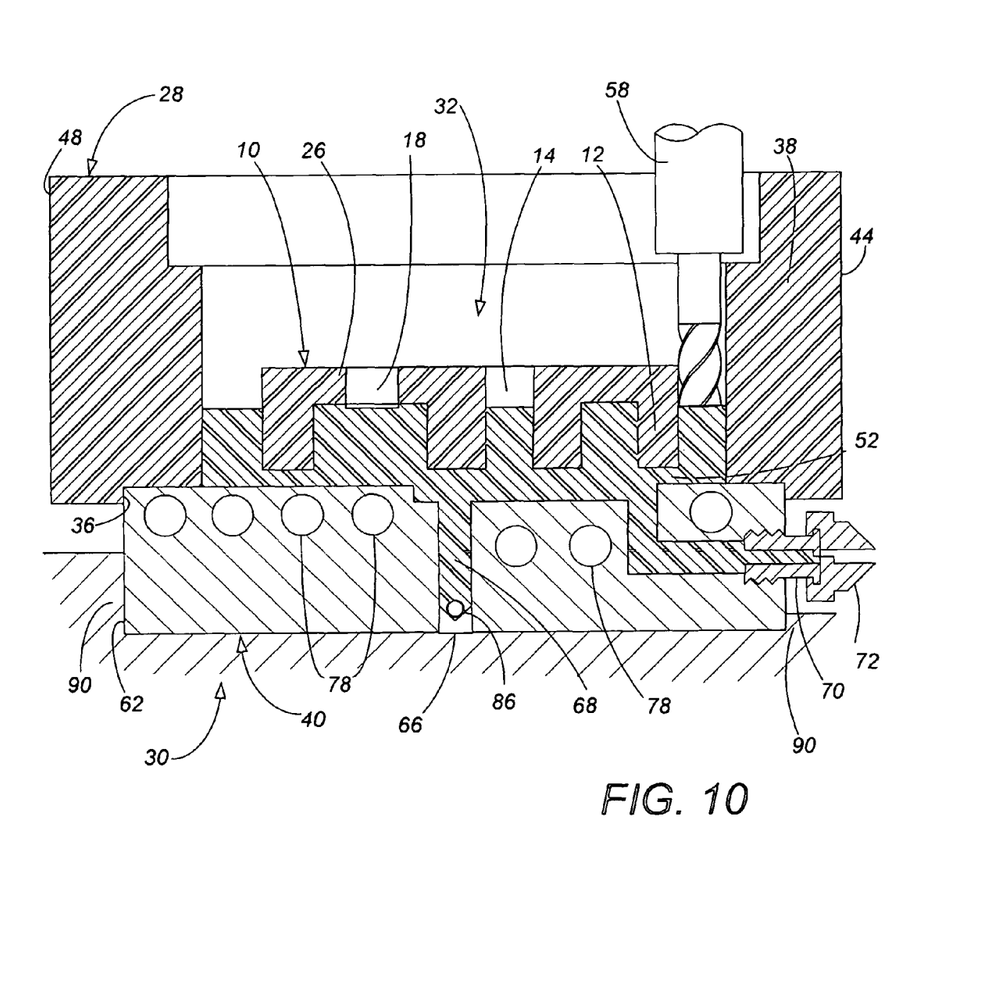
FIG. 10 is a cross-sectional view taken at the same (lines 6-6) cut location as FIG. 6 during CNC machining of a "B" side of the part in the block of material.
Figure 11:
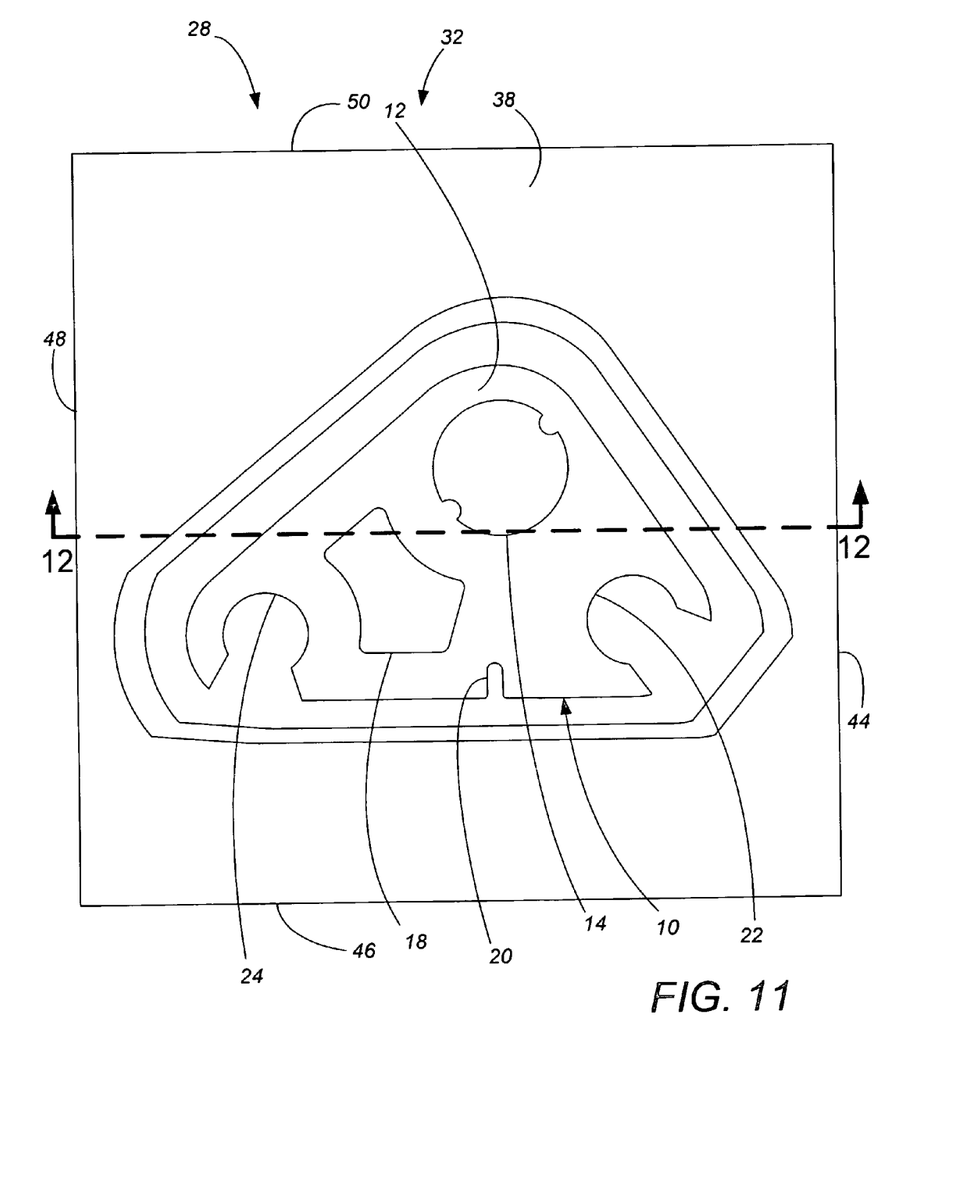
FIG. 11 is a B-side plan view of the block of FIG. 10 after removal of the potting/registration fixture.
Figure 12:
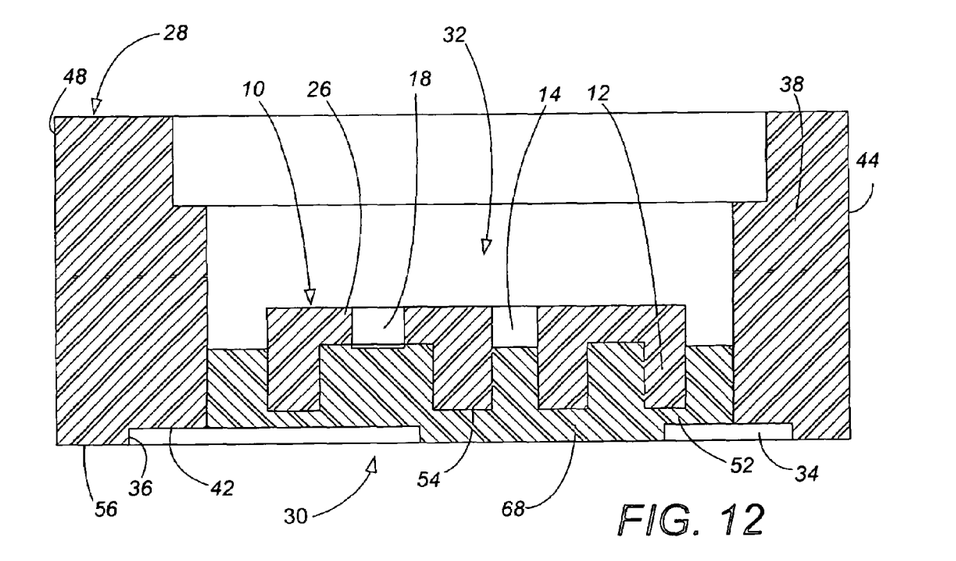
FIG. 12 is a cross-sectional view taken along lines 12-12 in FIG. 11.
Figure 13:
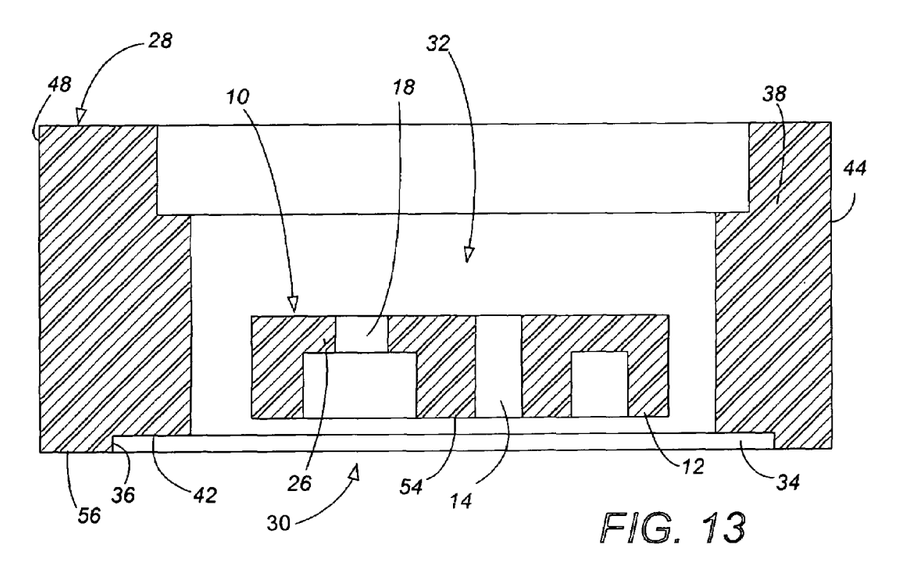
FIG. 13 is a cross-sectional view taken at the same (lines 12-12) cut location as FIG. 12, showing a conceptual suspension of the part in the block remainder.

CNC machining is continued on the B-side 32 of the part 10 as shown in FIG. 10 until the substantial entirely of the surface profile of the part 10 has been machined as shown in FIGS. 11 and 12. As used herein, this is called "total profile machining", as very little or none of the surface of the original block 28 provides any of the surfaces of the part 10. Total profile machining does not necessarily mean that other forming operations could not be used to form a surface of the part 10, but rather to indicate that the machining operations result in a substantially complete separation between the part 10 and an encircling outer portion 38 of the block 28.

Once the B-side machining has progressed to the point that the part 10 is substantially or totally defined separate from the encircling portion 38 of the block 28, then the potting material 68 is removed from the part 10 to free the part 10 from the block 28. The method of removal of the potting material depends upon what type of potting material was selected, with the preferred methods being melting off the potting material and dissolving the potting material in a solvent. If heat is applied during removal of the potting material 68, care must be taken that the part 10 is not heated to the melting or softening temperature of the workpiece material of the part 10. With the most preferred potting material 68 of water soluble RIGIDAX, removal of the potting material 68 is simply performed by washing the part 10 in water. The part 10 is then free to be shipped to the customer in accordance with the Protomold patented system and other prior art methods.

A separate advantage of the heating/cooling mechanism of the preferred registration/potting fixture 40 arises after machining the B-side 32 of the part 10. If the support material is to be removed from the part 10 by heating the potting material over its melting temperature, then the heating mechanism 78, 80 can be used for this purpose. Even if the primary mechanism of removing the potting material 68 from the part 10 is by dissolving the potting material 68 in a solvent, it still may be beneficial to apply heat to the registration/potting fixture 40 to rapidly remove the registration/potting fixture 40 from the part/encircling block/solidified potting material.

If desired, the encircling portion 38 of the block 28 and/or chips removed from the part 10 during machining can be gathered, melted and reused for additional blocks of workpiece material. If desired, after its removal from the part 10 the potting material 68 can be gathered and reused for potting of additional subsequent parts. Both of such reusing acts reduce the amount and cost of material waste associated with the present invention.

It will thus be understood that the present invention provides a method and apparatus for automated total profile machining of parts. Because the parts are fixtured into the CNC press without regard to the shape of the part and without criticality of the shape or positioning of the workpiece material block 28, the invention accurately total profile machines parts without the need to design any custom fixturing for the shape of the part. Without the need for custom fixturing and with a method and apparatus which can be equally applied to a wide variety of part shapes, parts can be total profile machined at a much lower cost than was previously possible.

Although the present invention has been described with reference to preferred embodiments, workers skilled in the art will recognize that changes may be made in form and detail without departing from the spirit and scope of the invention. As one example, the CNC machining of the A- and B-sides of the part is explained in steps to facilitate understanding of the inventive method. The order of machining various sections of the A-side of the part is unimportant, provided all are machined prior to potting the A-side recess. Similarly, the order of machining various sections of the B-side of the part is unimportant.

The invention claimed is:

1. A method of machining a part, comprising:
   machining a block of workpiece material in a first orientation to define:
   a first portion of an outer surface of the part; and
   an encircling recess extending peripherally around and removed from the machined portion of the outer surface of the part;
   placing a potting fixture into the encircling recess, such that the potting fixture and the block together define a substantially enclosed cavity, the potting fixture having a port for receiving a fluid material therethrough into the substantially enclosed cavity;
   introducing a fluid support material through the port into the substantially enclosed cavity and into supporting contact with the first portion of the outer surface of the part;
   solidifying the fluid support material;
   machining a second portion of an outer surface of the part while the part is supported by the solidified support material in a second orientation; and removing the support material from the machined part.

2. The method of claim 1, wherein the encircling recess is a registration recess, wherein the machining in the first orientation is performed with a CNC machine and further comprising:
using the potting fixture to position and fixture the block of workpiece material in the second orientation in a CNC machine.

3. The method of claim 1, further comprising:
applying negative pressure to the substantially enclosed cavity prior to introducing the fluid support material into the substantially enclosed cavity.

4. The method of claim 1, wherein the block of workpiece material is a thermoplastic polymer material.

5. The method of claim 1, wherein the fluid support material is a water soluble wax.

6. The method of claim 1, wherein the support material has a melting temperature which is less that a melting temperature of the workpiece material of the part, and wherein removing to support material from the machined part comprises heating the machined part and attached support material to a temperature above the melting temperature of the support material and below the melting temperature of the workpiece material for the part.

7. The method of claim 1, further comprising:
outgassing the fluid support material under negative pressure prior to introducing the fluid support material into the substantially enclosed cavity.

8. The method of claim 1, further comprising:
cooling the potting fixture to conductively solidify the fluid support material.

9. A method of machining a part, comprising:
machining a block of workpiece material in a first orientation in a CNC machine to define:
a first portion of an outer surface of the part; and
a registration recess;
placing a potting fixture into the registration recess,
using the potting fixture to introduce a fluid support material into supporting contact with the first portion of the outer surface of the part;
solidifying the fluid support material;
using the potting fixture to position and fixture the block of workpiece material in a second orientation in a CNC machine;
machining a second portion of an outer surface of the part while the part is supported by the solidified support material in the second orientation in the CNC machine; and
removing the support material from the machined part.

10. A method of machining a part, comprising:
machining a block of workpiece material to define a cavity including a first portion of an outer surface of the part;
evacuating air under negative pressure from the cavity;
introducing a fluid support material into the evacuated cavity and into supporting contact with the first portion of the outer surface of the part;
solidifying the fluid support material;
machining a second portion of an outer surface of the part while the part is supported by the solidified support material; and
removing the support material from the machined part.

11. A method of machining a part, comprising:
machining a block of material to define a cavity including a first portion of an outer surface of the part;
outgassing a fluid support material under negative pressure;
introducing the outgassed fluid support material into supporting contact with the first portion of the outer surface of the part;
solidifying the fluid support material;
machining a second portion of an outer surface of the part while the part is supported by the solidified support material; and
removing the support material from the machined part.

12. A method of machining a part, comprising:
machining a block of material in a first orientation to define a first portion of an outer surface of the part;
introducing a fluid support material into supporting contact with the first portion of the outer surface of the part;
conductively cooling the fluid support material with a cooling structure in contact with the fluid support material to solidify the fluid support material against the part;
machining a second portion of an outer surface of the part while the part is supported by the solidified support material in a second orientation; and
removing the support material from the machined part.

13. The method of claim 12, wherein the cooling structure is in contact with the solidified support material during machining of the second portion of the outer surface of the part.

14. A method of machining a part, comprising:
machining a block of material in a first orientation to define:
a first portion of an outer surface of the part; and
a registration recess;
introducing a fluid support material into supporting contact with the first portion of the outer surface of the part;
solidifying the fluid support material against the part;
using a fixture in the registration recess to position and fixture the block of workpiece material in a second orientation in a CNC machine;
machining a second portion of an outer surface of the part while the part is supported by the solidified support material in the second orientation in the CNC machine; and
removing the support material from the machined part.

15. The method of claim 14, wherein the fixture comprises a heat control mechanism for transferring heat to or from the fixture.

16. The method of claim 15, wherein the heat control mechanism is a heat transfer fluid circulated in one or more channels in the fixture, and further comprising a heating or cooling the heat transfer fluid.

17. The method of claim 16, wherein the heat control mechanism comprises a cooled fluid circulated in one or more channels in the fixture and a heated fluid circulated in one or more channels in the fixture.

18. The method of claim 14, wherein the fluid support material is introduced from a reservoir through the fixture into supporting contact with the first portion of the outer surface of the part, and further comprising releasing the fixture from fluid communication with the reservoir prior to machining the second portion.

19. The method of claim 14, wherein the fixture comprises a valve for allowing air removal from the partially machined part, the valve being closable so the fluid support material can be packed under pressure against the partially machined part.

* * * * *